United States Patent [19]

Lee, II

[11] Patent Number: 4,706,705
[45] Date of Patent: Nov. 17, 1987

[54] CHECK VALVE

[75] Inventor: Leighton Lee, II, Guilford, Conn.

[73] Assignee: The Lee Company, Westbrook, Conn.

[21] Appl. No.: 846,962

[22] Filed: Apr. 1, 1986

[51] Int. Cl.$^4$ .............................................. F16K 21/10
[52] U.S. Cl. .............................. 137/514.5; 137/454.2; 137/469; 137/516.27; 137/539.5
[58] Field of Search ...................... 137/454.2, 469, 514, 137/514.3, 514.5, 515, 516.27, 539, 539.5, 515.3

[56] References Cited

U.S. PATENT DOCUMENTS

| | | | |
|---|---|---|---|
| 1,094,267 | 4/1914 | Sullivan | 137/515.3 X |
| 1,798,631 | 3/1931 | Rodler | 137/539.5 X |
| 2,431,769 | 12/1947 | Parker | 137/516.27 X |
| 2,632,458 | 3/1953 | Slomer | 137/539 X |
| 2,858,838 | 11/1958 | Scaramucci | 137/454.2 |
| 3,072,144 | 1/1963 | Cassell | 137/514.5 |
| 3,347,266 | 10/1967 | Hansen | 137/454.2 X |
| 3,375,844 | 4/1968 | Mercier et al. | 137/516.27 X |
| 3,589,386 | 6/1971 | Chapman et al. | 137/469 X |
| 3,746,038 | 7/1973 | Simmons | 137/539.5 X |
| 3,894,556 | 7/1975 | Pareja | 137/539 |

FOREIGN PATENT DOCUMENTS 5594070 7/1980 Japan ...................................... 137/514

Primary Examiner—Alan Cohan
Assistant Examiner—John A. Rivell
Attorney, Agent, or Firm—Chilton, Alix & Van Kirk

[57] ABSTRACT

A miniaturized check valve comprises a generally tubular body including a cylindrical base and a guide sleeve of reduced diameter which axially extends from the base. The body forms a an interior valve seat which surrounds an axially extending fluid passageway. The guide sleeve has a plurality of angularly spaced discharge openings and a pair of pilot orifices which are axially spaced from the valve seat. A valve ball is displaced from the valve seat to form a fluid flow path which extends generally axially through the valve seat and into the guide sleeve and thereafter generally radially through the orifices and openings for flow exteriorly of the guide sleeve. The ball is biased by a spring assembly which comprises a pair of axially aligned springs having a relatively low pre-load force and low spring rate.

11 Claims, 3 Drawing Figures

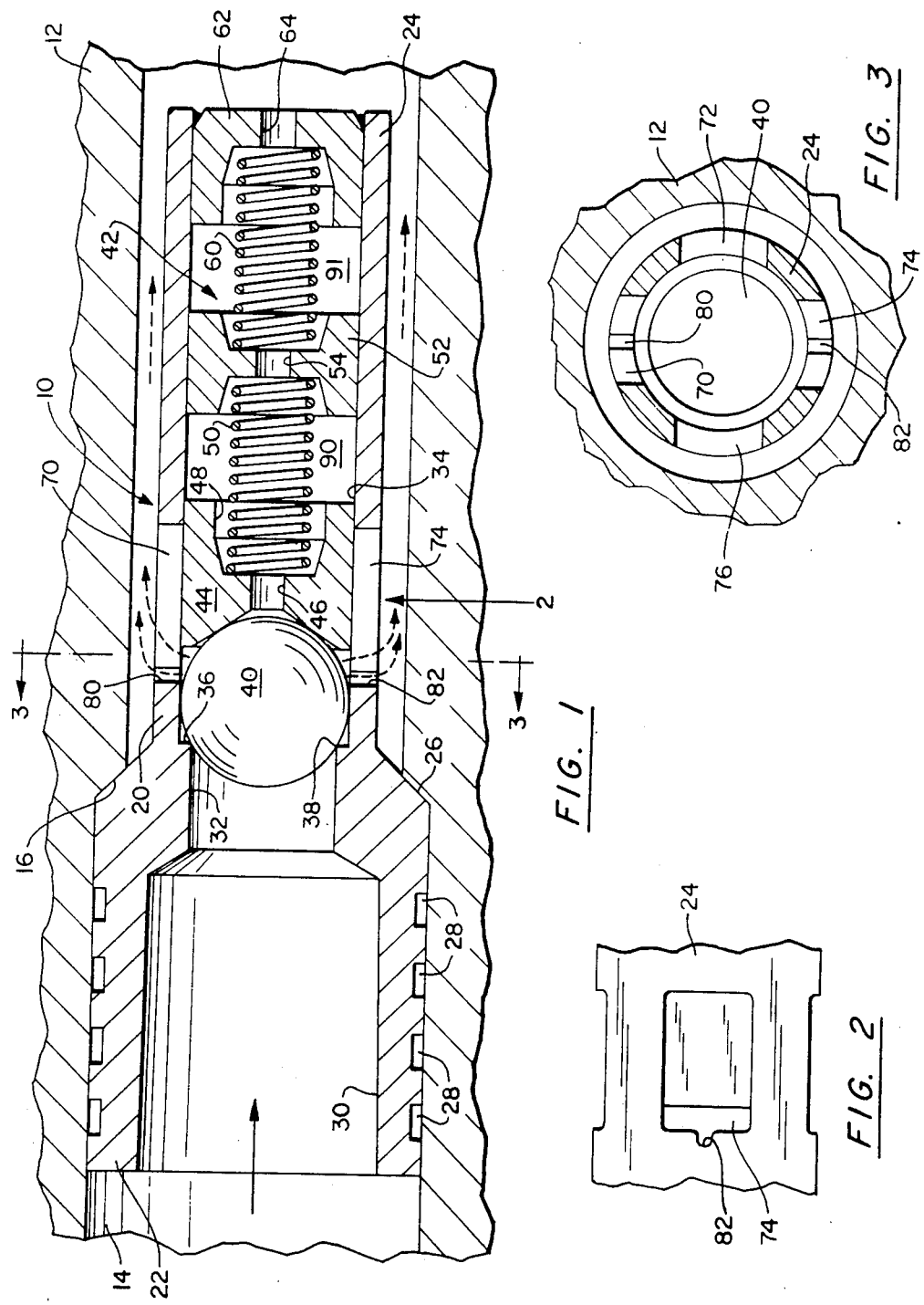

CHECK VALVE

BACKGROUND OF THE INVENTION

This invention relates generally to check valves employed to provide generally unidirectional flow through a fluid passageway. More particularly, the present invention relates to miniaturized check valves of a type which employs a spring biased ball to control the fluid flow through the valve.

The provision of a compact check valve suitable for use at both high and low flow rates entails satisfying a number of design constraints simultaneously. The present invention is a new and improved check valve or relief valve of compact form wherein the valve is directed to having a relatively low resistance to fluid flow. One of the principal obstacles to providing a low resistance to flow characteristic in a conventional check valve is the flow path through the valve mechanism which flow path tends to impinge the valve members and the spring return assembly to thereby add significantly to the resistance of the fluid flow. The low resistance to fluid flow of the present invention is in part a function of the improved fluid flow path through the check valve.

It is also generally desirable for a check valve to have a high gain characteristic wherein as the pressure is increased to open the check valve, for a unit of pressure increase, the valve opening area also increases by a corresponding incremental amount. For a check valve with an extremely high gain characteristic, any pressure increase in the free flow direction causes the valve to approach a maximum opening position with a very small restriction to flow in the free flow direction. However, implementing such a high gain characteristic in a conventional check valve tends to adversely effect the closing rate of the valve with favorable high gain and the valve closing rate being generally inversely related.

In the event that the pressure differential is reversed from the free flow direction, a mechanism is employed in a conventional check to return the valve to the closed position so that there will be no or minimal backflow through the valve. Naturally, the spring mechanism which conventionally functions to close the valve correspondingly diminishes the favorable gain characteristics of the valve. Consequently, the greater and thus more favorable the valve closure rate, the less favorable the gain characteristic of the valve. Conventional spring biased ball check valves implement a mechanical compromise wherein the return spring has a relatively low spring rate or pre-load whereby the spring biases the ball to the closed position with an acceptable closure rate and provides acceptable gain characteristics for the valve in the free flow direction.

The use of a spring having a relatively low spring rate introduces additional negative consequences in conventional check valves. A relatively low spring rate results in a valve mechanism which tends to be driven in oscillation as a result of the natural frequency of the mass of the spring and the valve and the mechanical spring rate of the valve system. At the same time, the hydrodynamic forces which are exerted through the valve also tend to be sinusoidal in nature and thus tend to excite and drive the valve in a natural frequency oscillation. Such valve oscillation produces a squealing or chattering condition which is deleterious to valve performance. The foregoing instability characteristics inherent in a low rate spring can be overcome by employing a valve spring having a higher spring rate which of course detracts from the high gain characteristics of the valve.

For check valves of highly miniaturized or compact configurations, it is also especially critical that fluids, at very low flow rates, flow through the valve for extended periods of time without contaminants accumulating on or around the valve seat. The foregoing contamination or silting condition prevents a valve from subsequently fully closing in the presence of a reverse differential pressure. If the reverse differential pressure is sufficiently high, the contaminants or silt can be effectively crushed or compressed. However, the required high reverse differential pressure ordinarily does not occur under conditions where the check valve is employed with normal reverse flow pressures. Naturally, if the spring pre-load is increased, the silting phenomena may be alleviated or minimized, but the opening pressure of the valve is adversely affected.

Accordingly, it is a principle aim of the present invention to provide a check valve of a highly compact configuration which valve has a relatively low resistance to fluid flow in the free flow direction, has structural features which alleviate adverse silting conditions, has a relatively stable spring system to alleviate valve chatter, has a favorable valve closure rate and has an improved free flow fluid path through the valve.

SUMMARY OF THE INVENTION

Briefly stated, the invention in a preferred form is a check valve comprising a generally tubular body which is adapted for mounting in a counterbore of a fluid conduit. The body comprises a generally cylindrical base and a guide sleeve of reduced diameter which axially extends from the base. The body forms an axially extending fluid passageway and an interior valve seat surrounding the passageway at an intermediate axial location. The guide sleeve has a plurality of angularly spaced discharge openings axially spaced from the valve seat and a pair of orifices axially spaced from the valve seat between the valve seat and the openings. A valve ball is closely received in the guide sleeve and axially displaceable therein. The ball is adapted for seating against the valve seat for sealing engagement therewith. A spring assembly axially biases the ball into sealing engagement with the valve seat so that when the force produced by the differential pressure applied to the ball exceeds the opposing force exerted by the biasing means, the ball is axially displaced in the guide sleeve to a position wherein the fluid flow path extends generally axially through the valve seat and into the guide sleeve and thereafter generally radially through the orifices and openings for flow generally exteriorly of the guide sleeve.

The spring assembly preferably comprises a pair of aligned springs and two damping members interposed between the springs and the ball. The spring assembly is axially displaceable in the guide sleeve. The damping members are slidably received in the guide sleeve and engage the sleeve to provide an axial damping displacement for the spring assembly. The guide sleeve in one form has four equiangularly spaced discharge openings of substantially identical generally rectangular shape, and the orifices are located at diametrically opposed locations of the sleeve at the boundaries of two of the discharge openings with the orifices being dimensioned to have a substantially smaller area than the area of the openings. The ball generally intersects the sleeve along a generally circular path for a pre-established axial distance as the ball is axially displaced from the valve seat.

BRIEF DESCRIPTION OF THE DRAWINGS

FIG. 1 is an axial sectional view of a check valve in accordance with the present invention illustrated in combination with a fluid conduit in which the valve has been mounted;

FIG. 2 is a fragmentary side view of a selected portion of the check valve of FIG. 1; and FIG. 3 is a fragmentary cross-sectional view of the check valve and fluid conduit taken along the line 3—3 of FIG. 1.

DETAILED DESCRIPTION OF THE INVENTION

With reference to the drawings wherein like numerals represent like parts throughout the figures, a check valve in accordance with the present invention is generally designated by the numeral 10. Check valve 10 is preferably of a compact miniaturized form which is mounted in position in a fluid conduit 12. As further illustrated in FIG. 1, the check valve 10 is inserted into a counterbore 14 having a circumferentially extending tapered shoulder 16. The direction of free flow from an upstream location to a downstream location through the formed fluid passageway and the check valve is generally designated by the arrows in FIG. 1. The broken arrows illustrate the directional flow path subsequent to the opening of the valve.

Check valve 10 comprises a tubular insert 20 which comprises a plug 22 of enlarged diameter and an axially extending sleeve 24 which integrally extends from the plug. The insert is preferably formed from aluminum or stainless steel. The exterior downstream end of the plug 22 forms a tapered shoulder 26 which in complementary fashion forcefully seats against the shoulder 16 of the counterbore. The plug is exteriorly dimensioned so that the plug is closely received in the enlarged portion of the counterbore. A plurality of circumferentially extending axially spaced grooves 28 traverse the exterior surface of the plug to form alternating axially spaced sealing lands and grooves. The outside diameter of the sleeve 24 is generally uniform and is less than the diameter of the reduced portion of the conduit bore so that a generally annular passageway is formed in the reduced bore portion between the sleeve 24 and the wall of the fluid conduit 12.

An enlarged tapered central axially extending bore 30 extends from the upstream end of the plug and communicates with a reduced bore 32 which extends through the opposite end of the plug. The check valve 10 is mounted in the fluid conduit by inserting the insert 20 into counterbore 14 so that the shoulder 26 of the plug axially seats against the counterbore shoulder 16. A tapered pin (not illustrated) is inserted into the tapered bore 30. The pin and the plug are dimensioned so that as the tapered pin is forcefully axially driven into the plug (to the right of FIG. 1), the pin forces the plug to controllably radially expand to thereby force the plug lands to sealingly engage the wall of the fluid conduit 12 in a fashion wherein the edges of the lands bite into the surrounding material of the conduit to form independent seals and retaining rings with the conduit. The expanded tapered bore subsequently functions as a fluid inlet passageway when the check valve is mounted in position as illustrated.

Reduced bore 32 opens into an enlarged uniform bore 34 which axially traverses the length of sleeve 24. The upstream end of bore 34 is defined by an annular shoulder 36 which intersects the end of the wall of bore 32 to form a sharp, well-defined continuous circular edge 38 which functions as a valve seat.

A valve member in the form of a spherical ball 40 is received in bore 34. Ball 40 has a diameter which is only very slightly less than the diameter of the bore 34. Ball 40 is axially displaceable for sealing engagement with seat 38 to prevent fluid flow through the check valve. Ball 40 is normally biased to the closed or seated position of FIG. 1 by a spring assembly designated generally by the numeral 42. In the seated position, the ball also intersects the wall of the bore 34 along a circular path axially spaced from seat 38 to form a quasi-secondary valve seat engagement with sleeve 24.

Spring assembly 42 includes a follower 44 forming a recess which is contoured to symmetrically engage against ball 40 to urge (to the left of FIG. 1) the ball to the closed seated position. The follower 44 has a cylindrical surface with a diameter which is approximately commensurate with the diameter of bore 34. Follower 44 is slidably received in sleeve 24 and axially displaceable therein. A central bore 46 extends axially through the follower to provide a vent passage so that the ball may be firmly engaged against the follower. The downstream end of the follower forms a central axially opening recess 48.

The recess 48 defines a retainer for receiving one end of a coil spring 50. The other end of coil spring 50 is captured in a retainer recess of an axially displaceable damping member 52. Damping member 52 contains an opposing, axially spaced retainer recess for capturing an end of a second coil spring 60. The damping member 52 has a generally cylindrical surface which is closely received by sleeve 24 to permit a restricted damped axial movement of the damping member 52. A damping bore 54 extends through the damping member 52 coaxially with the sleeve 24.

A generally cup-shaped end cap 62 is received at the downstream end of sleeve 24 and welded in fixed position to the sleeve. End cap 62 forms a retainer recess for fixably seating the opposite downstream end of spring 60. Cap 62 also contains a central damping bore 64 which axially aligns with the corresponding axially spaced damping bore 54. The damping bores 54 and 64 have generally equal diameters and cooperate with bore 34 to form a damping passage through the spring assembly 42.

Springs 50 and 60 are relatively short springs which are substantially identical and have a relatively low spring rate and low preload force. An exemplary spring rate is 0.4 lbs. per inch for each spring. Thus the dual spring configuration has an effective spring rate of 0.2 lbs. per inch. The dual spring configuration adds stability to the check valve while also allowing for sufficient axial displacement of ball 40 as described hereinafter. The damping member 52 functions as a guide member to prevent intermediate spring buckling or deformation that results from employing an equivalent single longer spring having a small pre-load force. The intermediate axially displaceable damping member 52 in cooperation with springs 50 and 60 functions to provide a damping mechansim to thereby minimize or alleviate deleterious oscillations and chatter in the valve mechanism. The reverse flow of fluid created by a reverse pressure differential traverses through the damping bores 64 and 54 to facilitate the damping process. Alternately, a series of three or more axially aligned short springs having a relatively low spring rate and low pre-load force with intermediately disposed damping members may be employed rather than the illustrated dual spring assembly.

Four equiangularly spaced, substantially identical discharge windows 70, 72, 74 and 76 are formed in sleeve 24. The foregoing windows have a generally rectangular shape and are axially positioned so that the upstream terminus of the windows is axially spaced downstream from the intersection of the ball 40 and the inner wall of the sleeve 24 when the ball is seated against seat 38. A pair of diametrically opposed notches at an intermediate location of the upstream boundaries of windows 70 and 74 form a pair of opposed pilot orifices 80 and 82. The upstream terminus of the orifices is axially spaced from the intersection of the ball 40 with the sleeve 24 in the seated closed valve position. The pilot orifices are dimensioned to provide both a significantly smaller opening in the sleeve than the windows to increase the discharge velocity through the pilot orifices, and an opening of sufficient size to readily pass silt or contamination particles in the fluid traversing the valve—even at low fluid flow rates. For example, in one embodiment the diameters of the pilot orifices are each approximately 0.008 inches, and the discharge windows each have an axial length of approximately 0.080 inches.

In accordance with the invention, a positive fluid pressure differential in the free flow direction of the arrows forces ball 40 to unseat and to be axially displaced (toward the right of FIG. 1). The positive pressure differential initially displaces the ball axially until the intersection of the sleeve with the circumference of the ball is axially displaced beyond the pilot orifices 80 and 82. Once the ball uncovers the orifices, the released fluid is initially propelled generally radially through the orifices. As the pressure differential increases, the ball will be further axially displaced to allow a relatively greater volume of fluid flow through the discharge windows 70, 72, 74 and 76. The resulting fluid flow path through the check valve (as illustrated by the broken arrows) extends initially generally axially through the valve seat and then generally radially through the pilot orifices and discharge windows to form a generally unobstructed flow path of annular cross-section between the outer surface of the cylindrical sleeve 24 and the inside wall of the adjacent conduit 12. Consequently, a relatively low resistance to fluid flow can be effectively implemented since the flow path is generally diverted from the region of the spring assembly 42.

The quasi-secondary valve seat formed at the intersection of the ball and the sleeve wall is effectively maintained for a pre-established axial distance even though the ball is displaced from seat 38. During the time interval in which the displaceable quasi-secondary valve seat is maintained, no more than a very small volume of fluid passes beyond the upstream side of the ball in the free flow direction. Because the ball must be axially displaced a significant distance (preferably on the order of 0.015 inches) before the fluid flow passes through the valving interface, silting at the valve seat can be effectively eliminated. The pilot orifices are dimensioned so that the silt particles will be forcefully expelled through the orifice openings even at relatively low flow rates. The opening through valve seat 38 is sufficiently large that the silt particles do not accumulate or collect at the valve seat.

The spring assembly 42 functions to provide favorable gain and stability characteristics for check valve 10. By employing the two relatively short, low rate springs or a series of several axially aligned springs, the implemented multi-spring system is equivalent to a single long low rate spring. However, the equivalent multi-spring assembly will not deform or buckle at the mid-point as may occur with the single long low rate spring. The intermediate damping member or members function as a guide to prevent buckling of the spring assembly.

Two spring cavity damping chambers 90 and 91 are formed within spring assembly 42. A minimal sliding clearance between the damping member 52 and the sleeve 24 causes the fluid in chambers 90 and 91 to be interconnected via damping bore 54 and the fluid in chamber 91 to be interconnected with the downstream fluid via damping bore 64. Consequently, axial movement of the damping member in either the upstream or downstream direction is inhibited by the fluid resistance of the damping bores. The dimensions of bore 54 may be decreased to enhance the damping and increased to reduce the damping. The damping members primarily function as a stabilizing element between the springs to prevent the valve from oscillating at or near its natural frequency or some other frequency due to hydrodynamic oscillations at the ball and seat.

In the event that the valve does approach a vibratory state near the natural frequency, the spring assembly configuration imposes an additional second order physical condition which must be satisfied before the valve achieves the oscillatory state.

It should thus be appreciated that the foregoing check valve 10 is a valve of very compact form which has a low resistance to fluid flow in the free flow direction and consequently a high gain characteristic. In one embodiment of check valve 10, the axial length of insert 20 is approximately 0.6 inches and the outside diameter of plug 22 is approximately 0.2 inches. The ball and seat valving configuration in combination with the tubular ball guide, the discharge window locations and the pilot orifice locations forces the valve member to open a substantial axial distance at relatively low flow pressures to thereby eliminate or minimize silting or contamination conditions. The valve is also very stable because of the second order damping provided by the multiple spring assembly and damping chambers 90 and 91. The substantially radial flow path presents a relatively unobstructed flow path through the check valve and further enhances the low flow resistance of the check valve.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit or scope of the present invention.

What is claimed is:
1. A check valve comprising:
a generally tubular body adapted for mounting in a counterbore of a fluid conduit comprising a generally cylindrical base and a guide sleeve axially extending from said base, said body forming an axially extending fluid passageway and an interior valve seat surrounding said passageway at an inter- mediate axial location thereof, said guide sleeve forming a plurality of angularly spaced discharge openings axially spaced from said valve seat and a pair of orifices axially spaced from said valve seat between said valve seat and said openings;

a ball closely received in said guide sleeve and axially displaceable therein, said ball being adapted for seating against said valve seat for sealing engagement therewith, said ball in said seated position forming a generally circular intersection with said sleeve, said intersection being axially spaced from said orifices in the seated position;

biasing means to axially bias said ball into sealing engagement with said valve seat;

so that when a differential pressure applied to the ball produces a force that exceeds the opposing force exerted by said biasing means, said ball is axially displaced in said guide sleeve for a pre-established axial distance wherein said intersection is generally maintained and a fluid flow path extends generally axially through said valve seat and into said guide sleeve, and as said ball is displaced from said valve seat a distance greater than said pre-established distance, the fluid flow path initially extends generally radially through said orifices and thereafter through said openings for flow generally exteriorly of said guide sleeve.

2. The check valve of claim 1 where in said base is traversed by a plurality of circumferential grooves and a tapered bore extends axially in said base.

3. The check valve of claim 1 wherein the guide sleeve has equiangularly spaced openings of substantially identical generally rectangular shape.

4. The check valve of claim 1 wherein said orifices are located at diametrically opposed locations in said sleeve at the boundaries of two said discharge openings, said orifices being dimensioned to have a substantially smaller area than the area of said openings.

5. A check valve comprising:

a generally tubular body comprising a base and a guide sleeve axially extending from said base, said body forming an axially extending fluid passageway and an interior valve seat surrounding said passageway at an intermediate axial location thereof, said guide sleeve forming an orifice and an axially adjacent discharge opening axially spaced from said valve seat, the tranverse dimensions of said orifice being substantially less than transverse dimensions of said discharge opening;

a valve member closely received in said guide sleeve and axially displaceable therein, said valve member being adapted for seating against said valve seat for sealing engagement therewith and substantially forming a generally circular intersection with said sleeve, said intersection being axially spaced from said orifice for a pre-established axial distance as said valve member is displaced from said valve seat; and biasing means to axially bias said valve member into sealing engagement with said valve seat;

so that when a differential pressure applied to the valve member produces a force that exceeds the opposing force exerted by said biasing means, said valve member is axially displaced in said guide sleeve wherein a fluid flow path extends generally axially through said valve seat and into said guide sleeve until the valve member is displaced to a first position axially spaced from said valve seat a greater distance than said pre-established axial distance at which position the fluid flow path is initially diverted generally radially through said orifice and not said discharge opening and thereafter at a second axial position the flow path extends through both said orifice and said discharge opening for flow generally exteriorly of said guide sleeve.

6. The check valve of claim 5 wherein said guide sleeve forms a pair of diametrically located orifices which are dimensioned and positioned so that the initial radial portion of the fluid flow path is through said orifices.

7. The check valve of claim 5 wherein the biasing means comprises a pair of axially aligned springs having a low rate and a damping member interposed between said springs.

8. A check valve comprising:

a generally tubular body adapted for mounting in a counterbore of a fluid conduit comprising a generally cylindrical base and a guide sleeve axially extending from said base, said body forming an axially extending fluid passageway and an interior valve seat surrounding said passageway at an intermediate axial location thereof, said guide sleeve forming a plurality of angularly spaced discharge openings axially spaced from said valve seat and a pair of orifices axially spaced from said valve seat between said valve seat and said openings;

a ball closely received in said guide sleeve and axially displaceable therein, said ball being adapted for seating against said valve seat for sealing engagement therewith; and biasing means to axially bias said ball into sealing engagement with said valve seat, said biasing means comprising a pair of aligned springs and a damping member interposed between said springs and axially displaceable in said guide sleeve;

so that when a differential pressure applied to the ball produces a force that exceeds the opposing force exerted by said biasing means, said ball is axially displaced in said guide sleeve to a position wherein a fluid flow path extends generally axially through said valve seat and into said guide sleeve and thereafter generally radially through said orifices and openings for flow generally exteriorly of said guide sleeve.

9. The check valve of claim 8 wherein said damping member is slidably received in said guide sleeve and slidably engages said sleeve to provide an axial damping of the displacement of said biasing means, and said ball.

10. The check valve of claim 8 further comprising a follower slidably received in said sleeve, said follower seating one end of one said spring and engaging against said ball.

11. The check valve of claim 10 wherein said follower and damping member form axial through-slots to partially define a fluid passageway extending axially through the biasing means.

* * * * *